INVENTORS.
Clyde L. Tyndale
Gerald H. Efinger
BY Samuel O. Raymond

Mattern, Ware & Davis
ATTORNEYS.

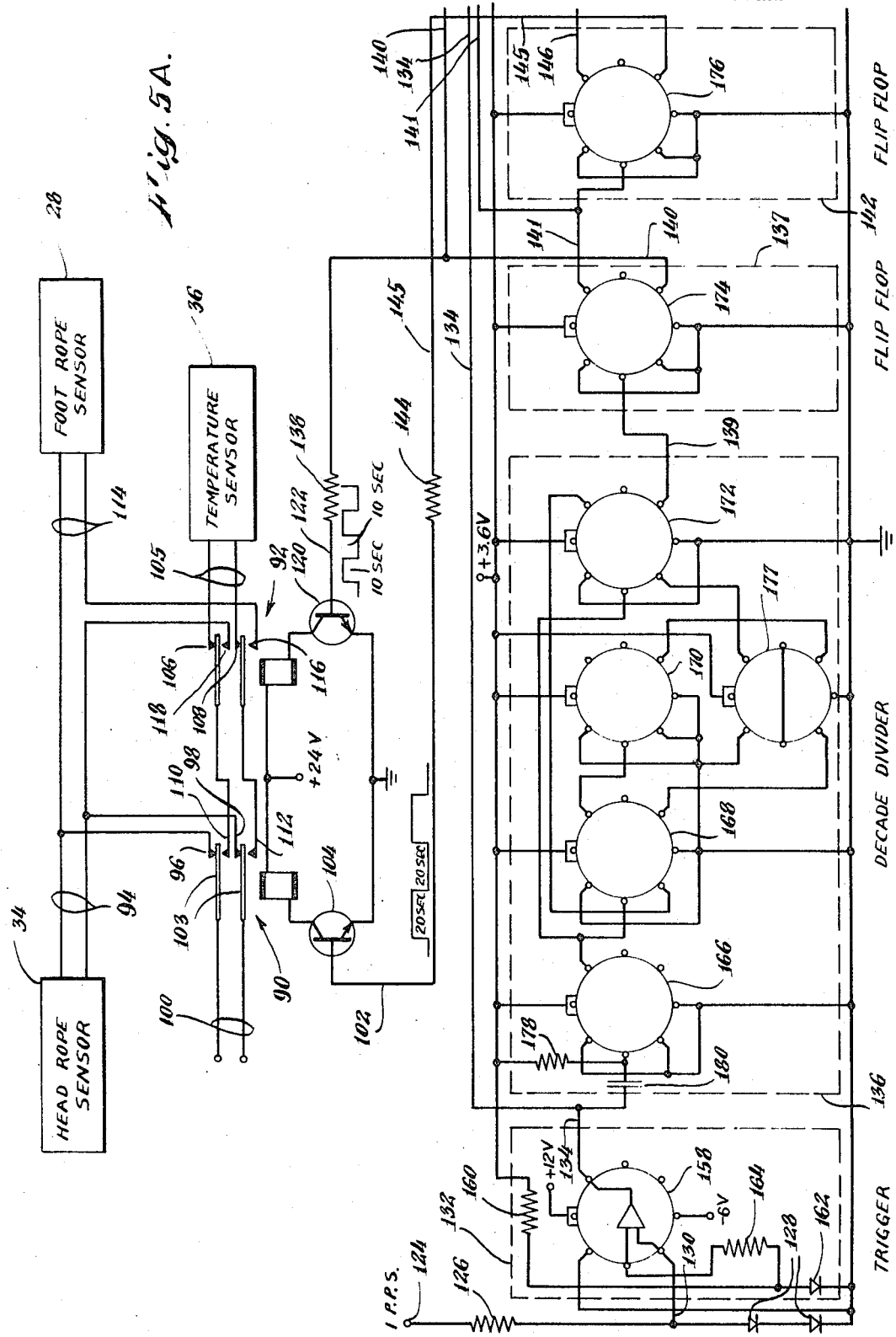

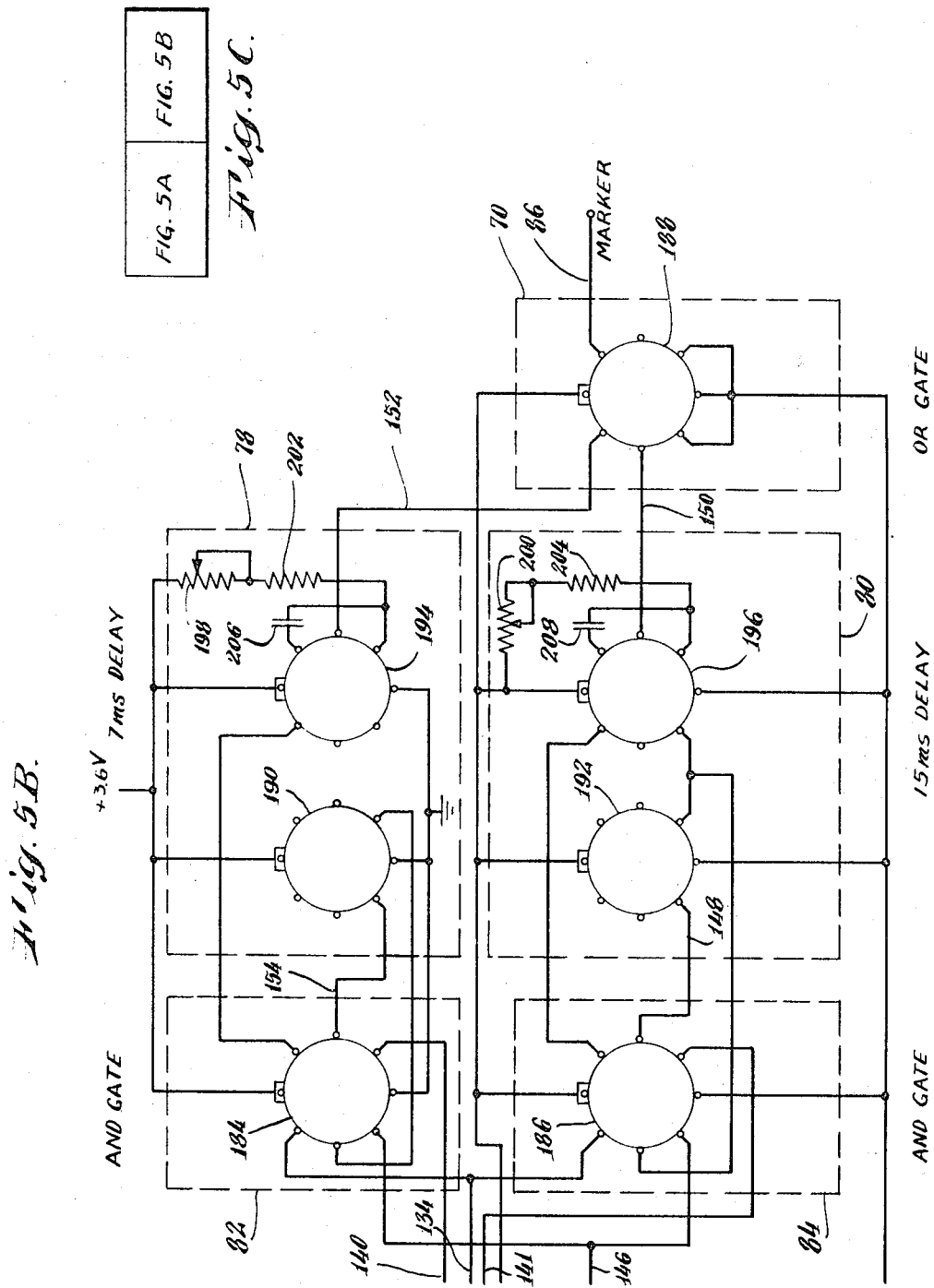

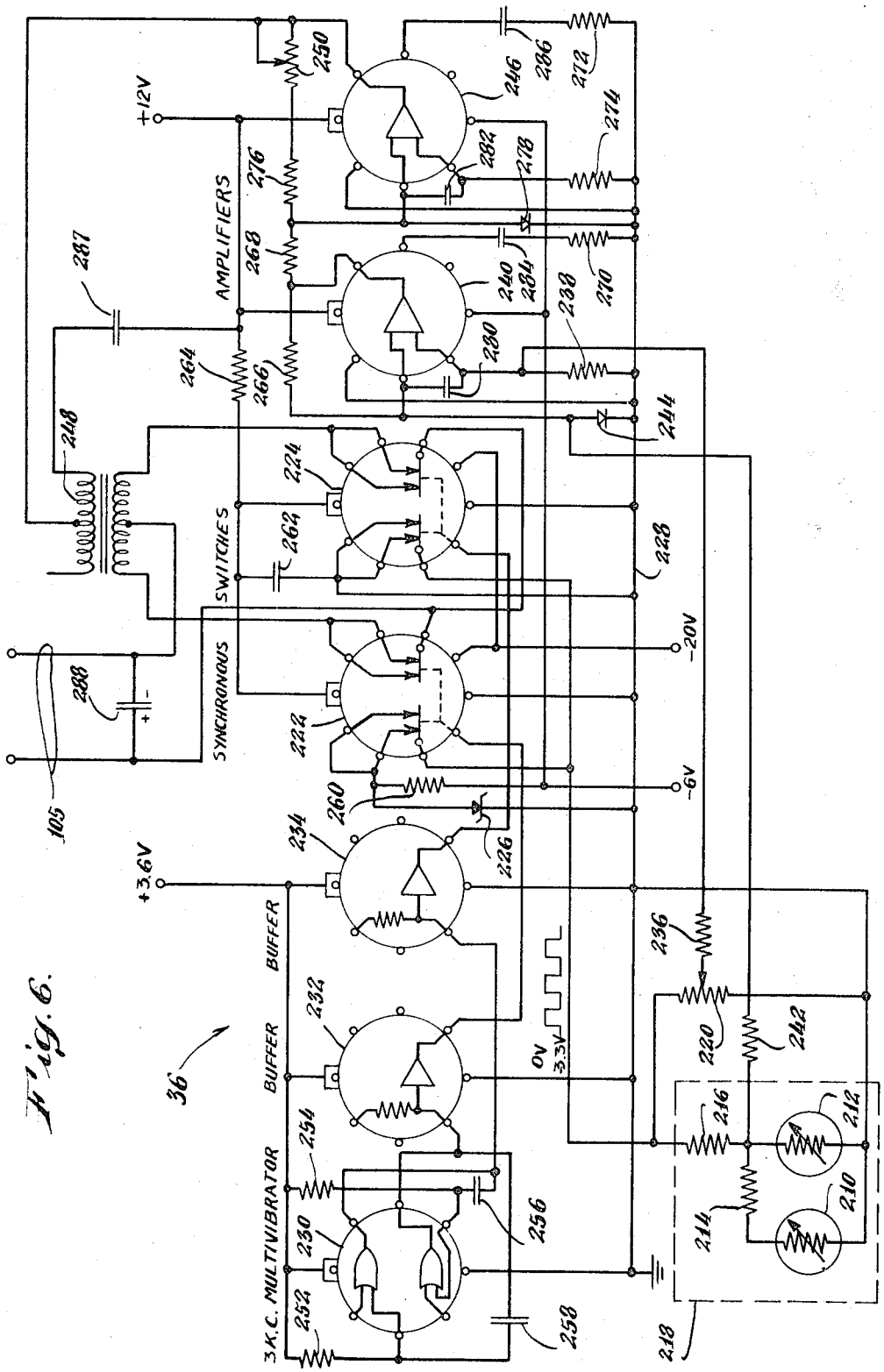

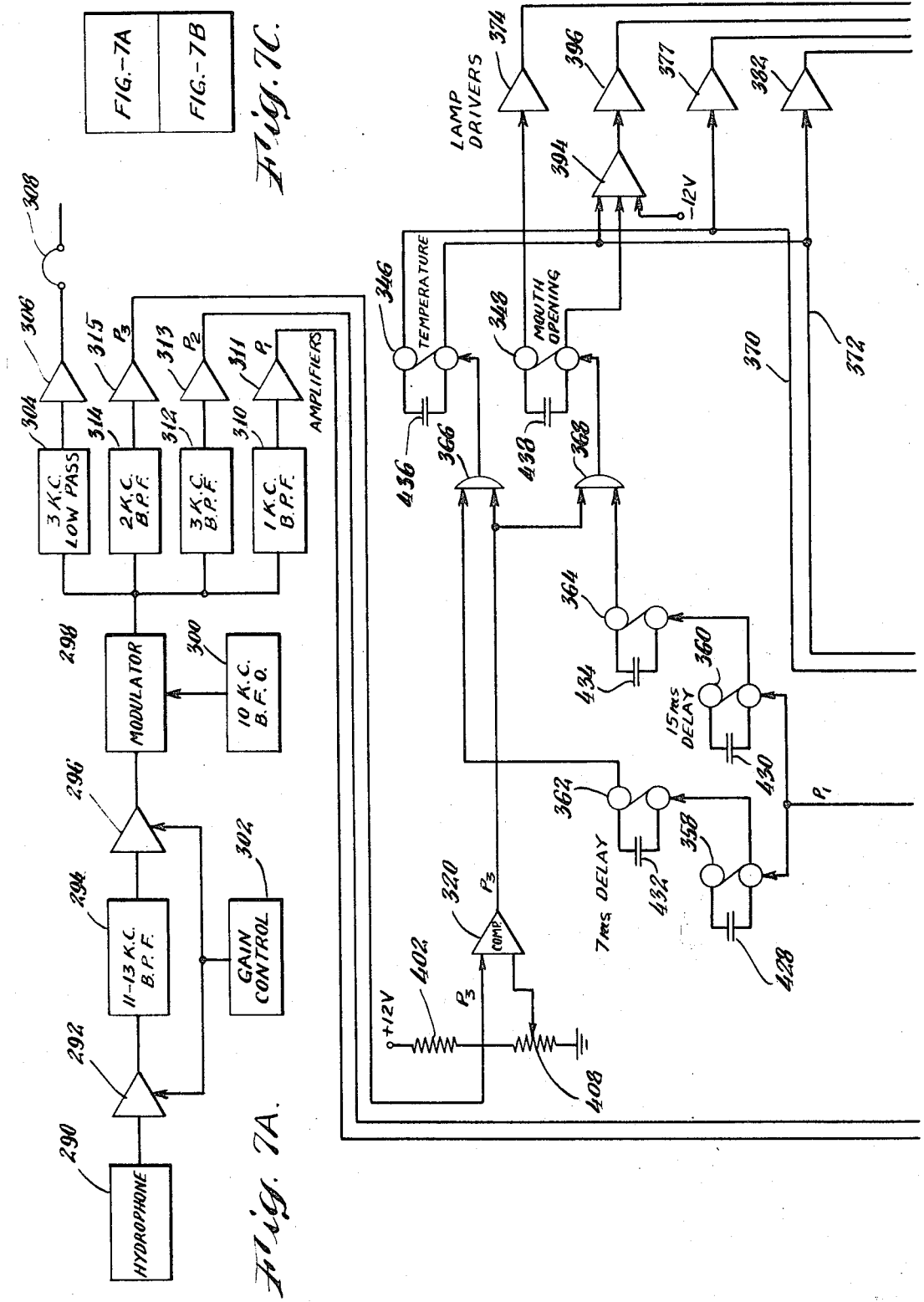

United States Patent Office 3,444,510
Patented May 13, 1969

3,444,510
MULTICHANNEL UNDERWATER ACOUSTIC
TELEMETERING SYSTEM
Clyde L. Tyndale, Falmouth, Gerald H. Efinger, Teaticket, and Samuel O. Raymond, Cataumet, Mass., assignors to Benthos, Inc., North Falmouth, Mass.
Filed Oct. 10, 1966, Ser. No. 585,671
Int. Cl. G01v 1/38
U.S. Cl. 340—5                  6 Claims

ABSTRACT OF THE DISCLOSURE

This application discloses a time division multiplex pulse position modulation telemetering system which communicates information about three variables: the depth of a fisherman's trawl net, the vertical opening of the trawl net, and the water temperature at the trawl net depth. Each sequence of information pulses begins with a reference pulse. Subsequently a data pulse occurs, the time interval between the reference pulse and the data pulse being proportional to the numerical value of the variable then being telemetered. Between the reference pulse and the data pulse a third pulse occurs, the time interval between the third pulse and the reference pulse indicating which of two variables is then being telemetered. If no third pulse occurs at all, this indicates that a third variable is then being telemetered. At the receiving end of the system, circuitry is provided which decodes the information and displays it in digital form in such a manner that the advantages of auto correlation are achieved. The receiving equipment automatically switches to accommodate itself to whichever one of the three variables is then being telemetered, and moreover automatically displays in alphabetic form an indication of which variable is then being telemetered. In addition, since two of the variables, trawl net depth and trawl net opening, are measurable in the same units, i.e. length, the receiving equipment takes advantage of this fact to reduce the amount of equipment necessary.

---

The present application is closely related to the United States patent application of Samuel O. Raymond entitled, "Underwater Acoustic Telemetering System," filed herewith. That application is incorporated herein by reference.

This invention relates to a multichannel underwater acoustic telemetering system. More particularly, it relates to an underwater telemetering system in which acoustic signals proportional to temperature and pressure or other variables are transmitted from an underwater transmitter to a receiver at or near the surface.

The invention has particular applicability to telemetering data from a trawl net to a trawling ship. The commercial embodiment of the invention disclosed herein comprises an acoustic pinger mounted to the trawlnet. The pinger operates over a frequency range of 11 to 13 kilocycles per second which is compatible with many prior art acoustic transducers. The pinger transmits short acoustic pulses having a frequency of 12 kilocycles per second at a pulse repetition frequency of approximately once per second. A second pulse having a frequency of 13 kilocycles per second is transmitted between these one second repeating pulses after an interval which is proportional to the variable being measured at the trawlnet. A third pulse having a frequency of 12 kilocycles per second is transmitted at either of two fixed times after the first pulse when either of two variables are being transmitted, and is not transmitted when a third variable is being transmitted.

In the commercial embodiment of the invention herein disclosed the variables transmitted are the depth of the head rope of the trawlnet, the temperature at the head rope and the mouth opening; that is, the distance between the head rope and the foot rope. Circuits of a pinger transmitter and a digital readout receiver for such a commercial underwater acoustic telemetering system are disclosed herein.

The receiver of the invention displays on a single numerical readout the digital value of the variable being measured. An illuminated panel displays the name of the variable automatically and a decimal point is automatically illuminated at the appropriate position in the display. The receiver comprises pulse oscillators gated by receipt of the three above-mentioned pulses and a single digital counter controlling the digital readout.

Many schemes have been proposed for telemetering information through water by acoustic waves. One form employs a frequency-modulated carrier; that is, a continuous frequency is transmitted and the frequency is changed slightly from a fixed frequency in proportion to the variable being transmitted. Another scheme which has often been proposed employs so-called pulse repetition rate modulation; that is, the acoustic waves are transmitted in short bursts, called pulses, comprising several waves of the fundamental frequency. The rate of repetition of these pulses is caused to be proportional to the variable being transmitted.

The frequency-modulated carrier system requires that the transmitter transmit continuously, thus consuming electrical power continuously. To converse electrical power, the acoustic output of such a system must be necessarily low. On the other hand, with our telemeter, since information is transmitted in pulse form, the acoustic output during the pulse can be quite high. Thus, only a small average power is required.

The fundamental problem with the pulse repetition frequency modulation scheme is that pulse echoes are often received in the sea environment either due to the sound reaching the ocean floor and being reflected back to the receiver or reaching a layer of high change in acoustic velocity which also causes an echo. These echoes are received at the receiver, oftentimes with the same or greater amplitude as the direct signals due to variations in absorption of the various paths of the signals through the sea. As a result, it is sometimes impossible to distinguish between echoes and the direct signal and a true reading cannot be made at the receiver.

In recent years, midocean trawling has become a preferred method of harvesting fish from the ocean. In such trawling, a large net (the trawl) is dragged on a long cable as much as two thousand yards behind the ship (the trawler) at depths of as much as three hundred fathoms. According to present practice, it is very difficult for the trawler captain to know the depth of his trawl and the condition of the mouth opening of the trawl. It is also desirable to know the temperature at the trawl. Sensors have been placed on the net and information transmitted to the trawler over an electrical cable. Such systems have proved troublesome, however, in the oceanographic environment. Thus, there has been a need for an underwater telemetering system for use by trawlers. The above-discussed frequency modulation and pulse repetition frequency systems were designed with this application in mind.

Systems using frequency modulation or pulse repetition rate modulation have not met with commercial success when measuring even one of the above-identified variable. They become extremely complex and, as a practical matter, completely unworkable when it is desired to transmit several variables.

In the above-identified copending application of Samuel

O. Raymond filled herewith, there is disclosed a system for transmitting a single variable from an underwater acoustic transmitter to a receiver by transmitting a first series of pulses at a fixed rate and transmitting a second series of pulses each at a time after one of said first pulses proportional to a variable being measured. This scheme has been demonstrated to be extremely reliable in the oceanographic environment. It is desirable that this scheme be applied to a multivariable transmission system.

The readout disclosed in the above-identified application, filed herewith, is a graphical recorder as commonly provided by prior echo sounders. The distance between marks on the graph paper noting receipt of the two pulses is measured and connected by consulting a table, or the like, to the units of the variable being transmitted. It is desirable that a more convenient readout be provided.

It is, therefore, an object of the present invention to provide an underwater acoustic telemetering system.

Another object of the invention is to provide an underwater acoustic telemetering system which overcomes the difficulties of the sound transmission characteristics of large bodies of water.

Still another object of the invention is to provide an underwater acoustic telemetering system of the above character for transmitting a plurality of variables.

A further object of the invention is to provide an underwater acoustic telemetering system of the above character for transmitting depth information.

A still further object of the invention is to provide an underwater acoustic telemetering system of the above character for transmitting temperature information.

A yet further object of the invention is to provide an underwater acoustic telemetering system of the above character for use by trawlers.

Another object of the invention is to provide an underwater acoustic telemetering system of the above character for transmitting the mouth opening dimension of a trawl.

Still another object of the invention is to provide a transmitter for an underwater acoustic telemetering system of the above character for mounting on a trawl.

Another object of the invention is to provide a receiver for an underwater acoustic telemetering system of the above character providing a readily interpretable readout.

A further object of the invention is to provide a receiver rearout for an underwater acoustic telemetering system of the above character providing a digital readout.

Still another object of the invention is to provide a receiver readout for an underwater acoustic telemetering system of the above character providing convenient change from English to metric units.

Yet another object of the invention is to provide an underwater acoustic telemetering system of the above character that is compatible with present hydrophones mounted on many trawlers.

A further object of the invention is to provide an underwater acoustic telemetering system of the above character that is rugged, simple, of low cost, and reliable in the oceanographic environment.

Other objects of the invention will in part be obvious and will in part appear hereinafter.

The invention accordingly comprises a system having the features of construction, combinations of elements, and arrangement of parts, utilizing a method comprising several steps and the relation of one or more of such steps with respect to each of the others, all as exemplified in the following detailed disclosure. The scope of the invention is indicated in the claims.

For a fuller understanding of the nature and objects of the invention, reference should be had to the following detailed description taken in connection with the accompanying drawing in which.

Figure 2:
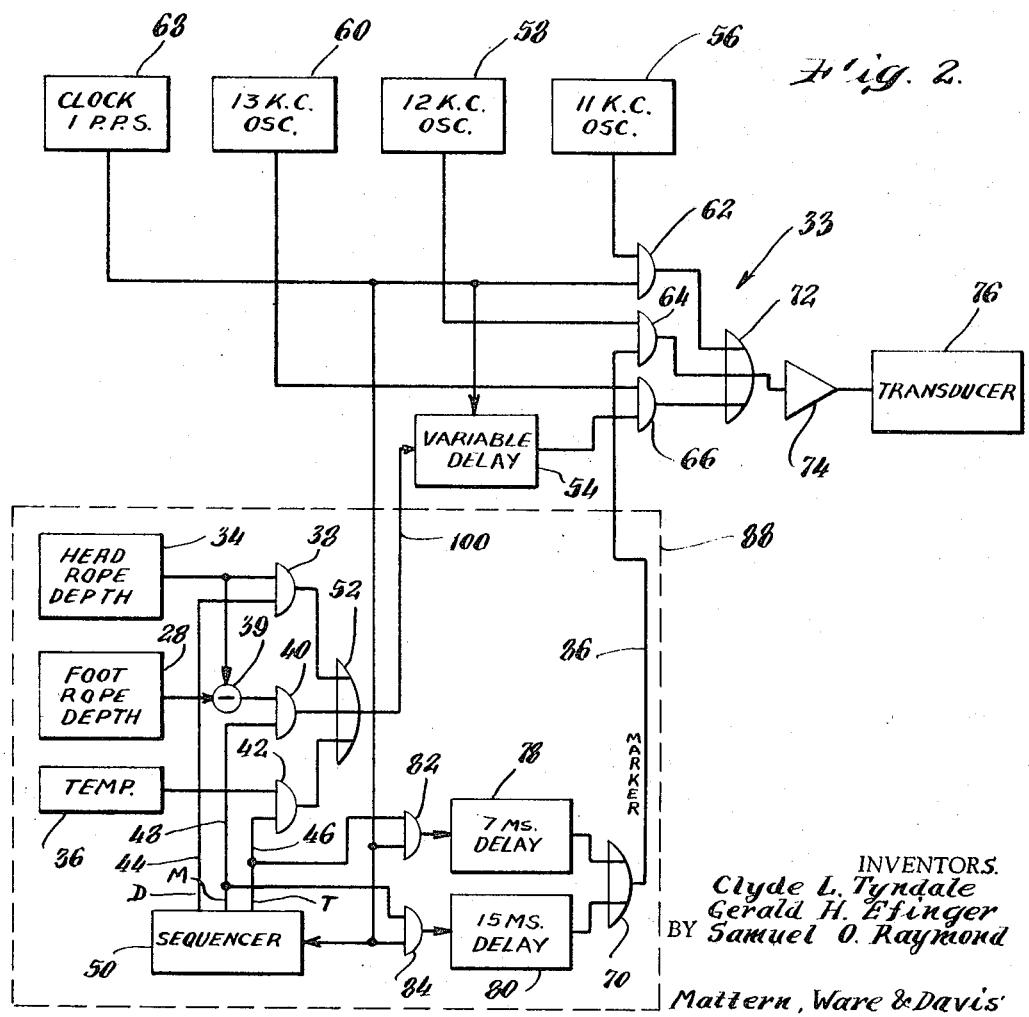
FIGURE 2 is a simplified block diagram of a pinger transmitter according to the invention.
Figure 7B:
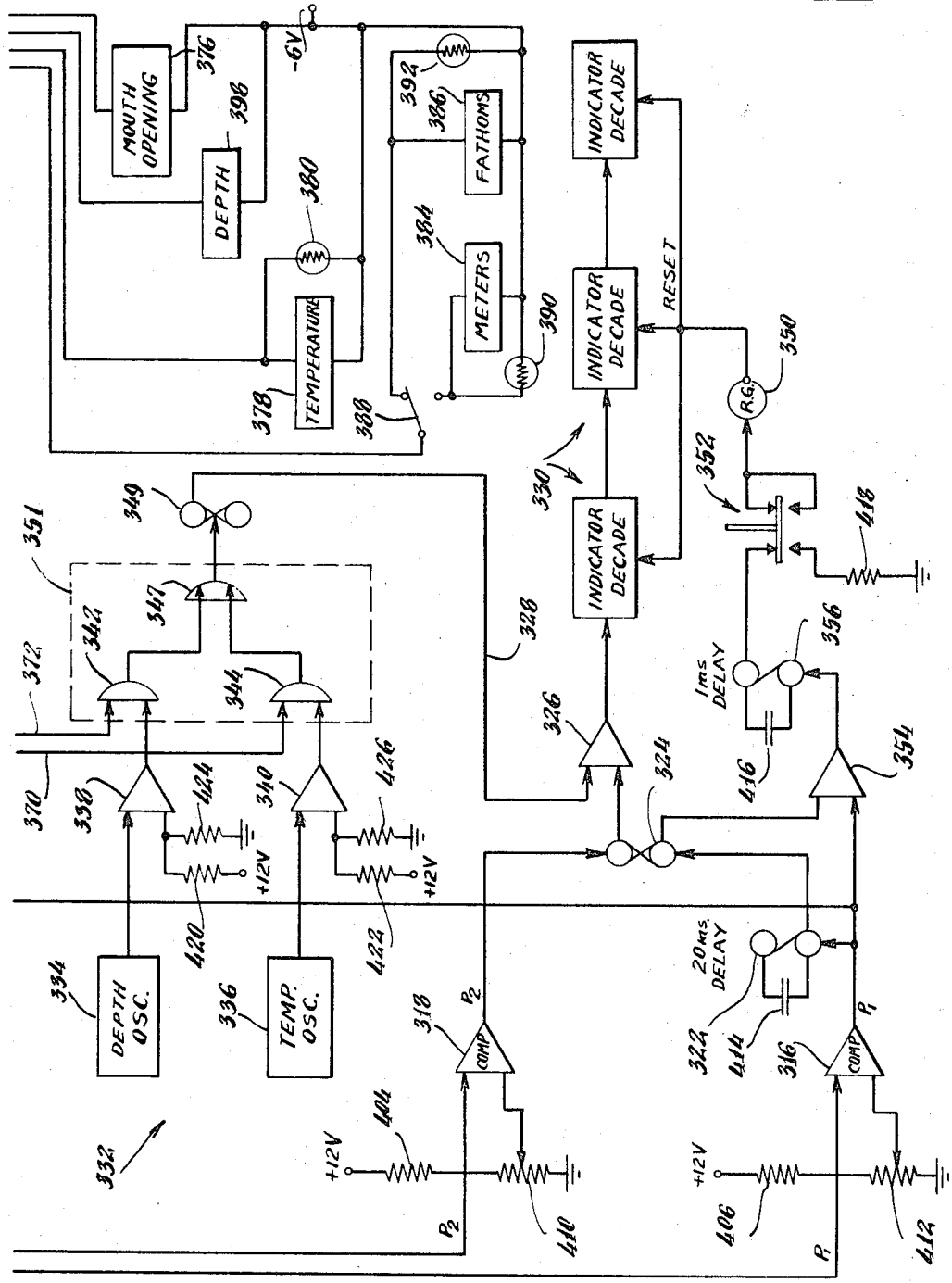

FIGURE 5, comprising FIGURES 5A and 5B, in a schematic electrical circuit diagram, partially in block form, of a commercial embodiment of the pinger transmitter of FIGURE 2;

FIGURE 5C is a diagram showing how FIGURES 5A and 5B may be put together to form FIGURE 5;

FIGURE 6 is a schematic electrical circuit diagram, partially in block form, of the temperature sensor shown in FIGURES 2 and 5;

FIGURE 7, comprising FIGURES 7A and 7B, is a schematic electrical circuit diagram, partially in block form, of a commercial embodiment of a receiver according to the present invention; and FIGURE 7C is a diagram showing how FIGURES 7A and 7B may be put together to form FIGURE 7.

The same reference characters refer to the same elements throughout the several views of the drawings.

The invention of the above-identified application, filed herewith, can be generally described as a method and apparatus for underwater acoustic telemetering of a variable wherein a first set of acoustic pulses is transmitted at a fixed repetition rate. In between said pulses a second set of pulses is transmitted, each at a time interval subsequent to the preceding one of said first pulses proportional to the variable being measured.

According to the present invention, there is a short space of time after each of said first pulses that is reserved for the transmission of control or marker pulses. These may be transmitted at fixed times after each of the first pulses and indicate the variable being transmitted. Thus, in the specific embodiment disclosed herein, two times are reserved and a third pulse occurring at either of said two times, or not at all, indicates which of the three variables is being transmitted.

It will be understood by those skilled in the art that the three pulses, the first pulse at the fixed repetition rate, the variable pulse, and the control or marker pulse, could all be transmitted at the same carrier frequency. However, according to the present invention, they are preferably transmitted at different frequencies to increase the discrimination capability of the system. Furthermore, these frequencies are chosen to be closely together in the frequency spectrum so that they may be transmitted and received by unitary acoustic transmitters.

As previously stated, the invention is particularly applicable to the trawling situation and the invention provides for the transmission of the depth of the head rope, the temperature at the head rope, and the mouth opening of a trawl. To this end, the invention provides a transmitter comprising three carrier oscillators corresponding to the first fixed rate pulses (Ping 1), the second variable pulses (Ping 2) and the control pulses (Ping 3). The transmitter further comprises two depth sensors, one mounted at the head rope and one mounted at the foot rope; a temperature sensor mounted at the head rope; and, gating and controlled delay means controlled by a sequencer for transmitting the pulses in the sequence described. The mouth opening variable is determined by subtracting the output of the head and foot rope depth sensors.

A receiver, according to the invention, generally comprises demodulation means for providing pulses on three separate control lines corresponding to the three pulses of the transmitted signal. An indicator counter is connected to an appropriate pulse oscillator at a fixed interval after receipt of each of the first set of fixed repetition rate pulses, the pulse oscillator to which the counter is connected being determined by the time of receipt, of lack or receipt, of the control pulse. When the mouth opening and the depth are to be measured in the same units, a single pulse oscillator may be provided for this function. Furthermore, the receiver comprises logic means for illuminating the displays indicating the variable being measured and the required decimal points.

Figure 1:
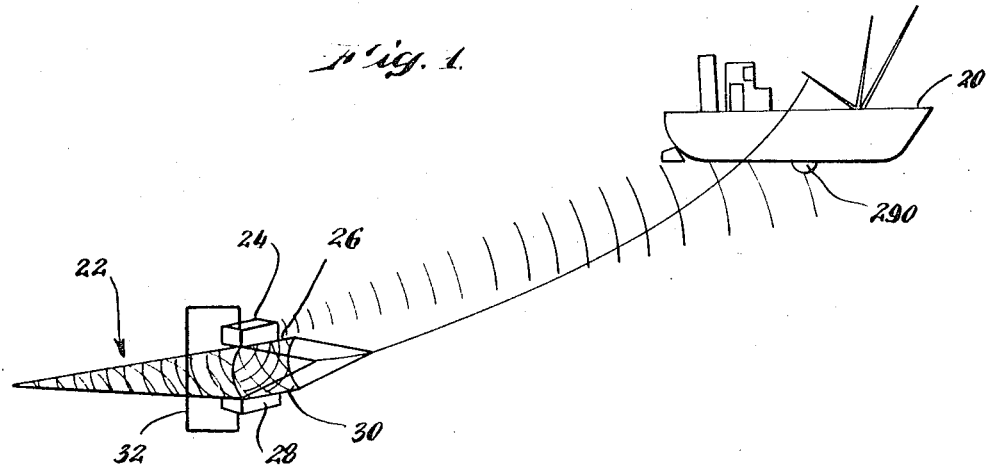
FIGURE 1 is a side elevation illustrating the present invention as applied to trawling.

More specifically referring to FIGURE 1, a trawler 20 tows a trawl, generally indicated at 22. The depth sensor, temperature sensor, and transmitter of the invention may be packaged in one or more pressure containers 24 attached to the head rope 26 of the trawl 22. A second depth sensor 28 is attached to the foot rope 30 and is connected via cable 32 to the electronics in container 24.

Now referring to FIGURE 2, the pinger transmitter, generally indicated at 33 comprises a head rope depth sensor 34, foot rope depth sensor 28, and temperature sensor 36 each producing an electrical signal output proportional to the variable being measured. The head rope depth signal is supplied to an AND gate 38; the difference between the head rope and foot rope signals (this being equivalent to the mouth opening signal) is derived at negative summation point 39 and supplied to AND gate 40. The temperature signal is supplied to AND gate 42. These signals pass through their respective AND gates. Each AND gate is activated by a signal on its second line. The signals are a depth control signal on line 44, a temperature control signal on line 46, and a mouth opening control signal on line 48. These are provided by the sequencer 50.

As only one of the signals, depth, temperature or mouth opening control, is provided on lines 44, 46 or 48 at a time, only one of the variable signals gets through the AND gates 38, 40 and 42 at a time. This signal passes through an OR gate 52 and controls a variable delay 54 in the manner fully described in the above-identified copending application filed herewith. Carrier oscillators 56, 58 and 60 operating at 11, 12 and 13 kilocycles per second, respectively, are also provided in the pinger transmitter 33. The continuous signals supplied thereby are gated by AND gates 62, 64 and 66, respectively— AND gate 62 being controlled by the output of a one pulse per second clock 68; AND gate 64 being controlled by the output of a marker OR gate 70; and AND gate 66 being controlled by the output of variable delay 54.

Just as in the above-identified copending application, the variable delay receives the clock pulses from the clock 68 and produces at a variable time thereafter, determined by the signal supplied to the variable delay from OR gate 52, a pulse which is supplied to AND gate 66. This pulse gates the 13 kilocycle oscillator. The modulated pulse passes through an OR gate 72, is amplified by an amplifier 74 and is supplied to an acoustic transducer 76.

The one per second clock pulses from clock 68 gate the 11 kilocycle oscillator at AND gate 62 and provide an 11 kilocycle modulated pulse passing through an OR gate 72 once per second. This signal is amplified by amplifier 74 and supplied to transducer 76.

The one pulse per second from the clock 68 is supplied to the sequencer 50 and controls its operation. This signal is also gated to a seven millisecond delay 78 by AND gate 82 and to a 15 millisecond delay 80 by AND gate 84. The outputs from these delays are combined at OR gate 70. The combined signal is the marker or control signal supplied on line 86 to AND gate 64 gating the 12 kilocycle oscillator 58. The other inputs to AND gates 82 and 84 are connected to the mouth opening and temperature control lines 48 and 46 from the sequencer 50. Thus, a clock pulse is supplied by AND gate 82 to seven millisecond delay 78 when the temperature control signal is present in line 46 and a clock pulse is supplied to 15 milli-second delay 80 when the mouth opening control signal is present on line 48.

The pulses supplied by the clock 68, variable delay 54, seven millisecond delay 78, and 15 millisecond delay 80 are all quite short in the order of 4 milliseconds.

Figure 3:
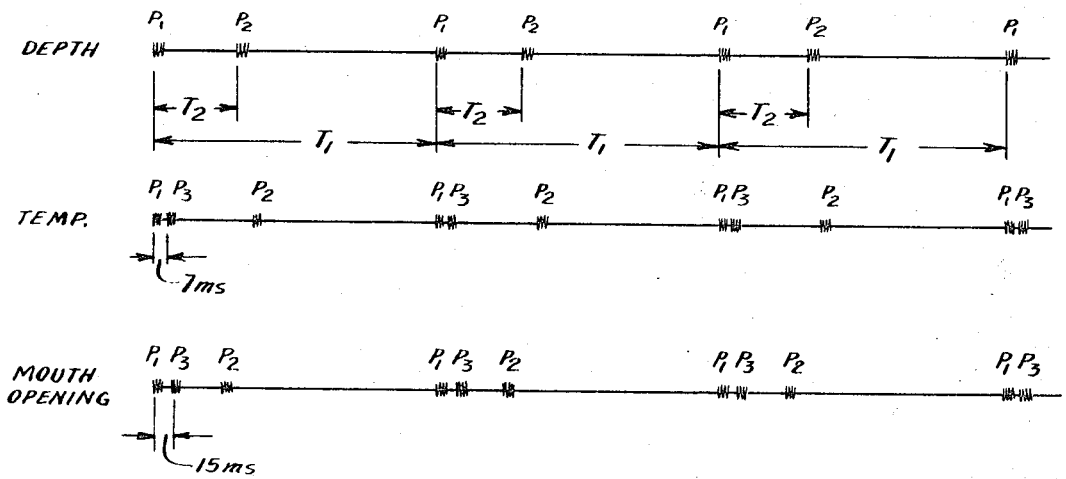
FIGURE 3 is a timing diagram of the acoustical signals produced by the pinger transmitter illustrated in FIGURE 2.

Thus, the acoustic signals transmitted by the transducer 76 occur as indicated in FIGURE 3. When depth is being transmitted, the first pulse Ping one ($P_1$) occurs once each second (the interval $T_1$). The variable delay 54 (FIGURE 2) is arranged such that the variably delayed pulse produced thereby and thus Ping two ($P_2$) occurs at some time during the interval from 20 to 400 milliseconds after $P_1$. Thus, as shown in FIGURE 2, Ping two occurs at time $T_2$, which is proportional to the depth being measured at the head rope depth sensor 34 (FIGURE 2).

When temperature is being measured, Ping one occurs at the regular one second intervals; Ping two occurs in the interval from 20 to 400 milliseconds after Ping one ($T_2$ being proportional to the temperature); and, Ping three occurs seven milliseconds after Ping one.

When the mouth opening is being transmitted, Ping one again occurs once each second; Ping two occurs during the information interval from 20 to 400 milliseconds; and Ping three occurs 15 milliseconds after Ping one.

It is preferable that each variable be transmitted to the surface several times before another variable is transmitted, both for convenience in display and to insure that the occasional receipt of an erroneous Ping two will be noted by an instantaneous change in the variable reading at the receiver. We, therefore, prefer to transmit the depth information for twenty seconds as indicated by the depth waveform in FIGURE 4 at forty second intervals. The temperature is transmitted for ten seconds every forty seconds and the mouth opening is also transmitted for ten seconds every forty seconds. These intervals can, of course, be varied to suit the user of the system.

The portion of the pinger transmitter 33 shown in FIGURE 2 enclosed in the dotted box 88 is shown in FIGURE 5. The logical functions of negative summation point 39, AND gates 38, 40 and 42, and OR gate 52, of FIGURE 2, are performed by the relays 90 and 92 of FIGURE 5. Thus, when relay 90 is deenergized as shown, the balanced line output 94 of the head rope sensor 34 is connected via the upper contacts 96 and 98 of relay 90 to the balanced line output 100 supplied to the variable delay 54 (FIGURE 2). Thus, referring to the diagram in FIGURE 4, relay 90 must be in its deenergized (OFF) state for twenty seconds and then in its energized (ON) state for twenty seconds and such a signal must be supplied on line 102 to its control transistor 104.

When relay 90 is energized, its swingers 103—103 transfer. If relay 92 remains deenergized, then the balanced line output 105 of temperature sensor 36 is connected via upper contacts 106 and 108 of relay 92, lower contacts 110 and 112 and swingers 103—103 of relay 90 to the balanced line input 100 of variable delay 54.

When both relays 90 and 92 are energized, one of the balanced line conductors 114 from the foot rope sensor 28 will be connected via lower contact 116 of relay 92 and lower contact 112 or relay 90 to one conductor of balanced line 100 and one conductor of balanced line 94 from head rope sensor 34 will be connected via lower contact 118 of relay 92 and lower contact 110 of relay 90 to the other conductor of balanced line 100. The other two conductors of the balanced lines 114 and 94 are connected together and to contact 96 of relay 90. The balanced lines 94 and 114 are phased such as to subtract the head rope sensor signal from the foot rope sensor signal. The signal supplied on balanced line 100 when both relays 90 and 92 are energized is proportional to the difference in depth between the head rope and the foot rope, i.e., the mouth opening. Thus, the function of the negative summation point 39 is accomplished.

Figure 4:
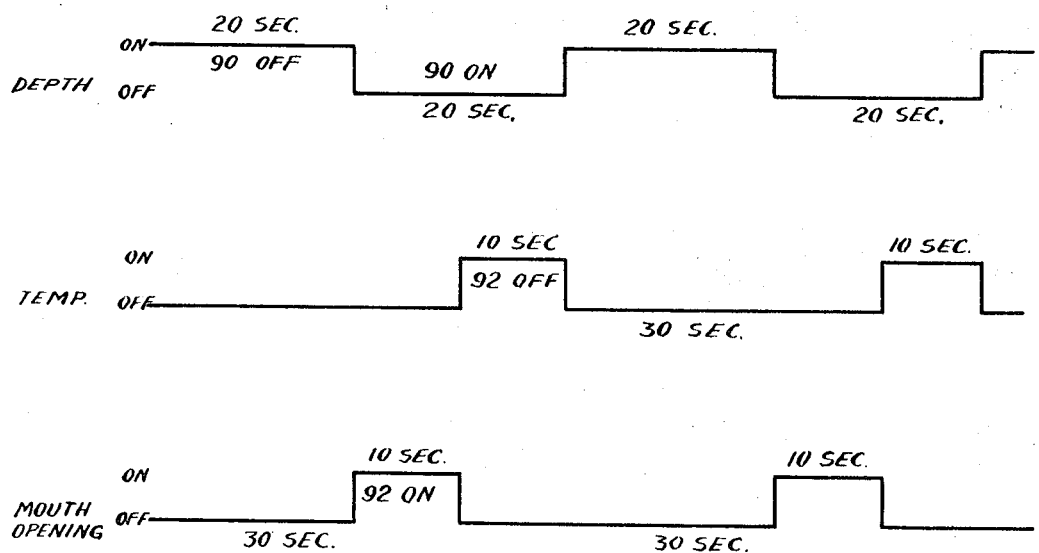
FIGURE 4 is a timing diagram of the sequence of transmission of the three variables provided by the disclosed embodiment of the system of the present invention.

In order to effect the sequence illustrated in FIGURE 4, relay 92 must at twenty second intervals be deenergized for ten seconds and then energized for ten seconds. Remembering that relay 90 when deenergized disconnects the balanced line 100 from relay 92 altogether, it will be seen that control transistor 120 may thus be supplied with alternate on and off ten second signals (a ten second square wave) as shown on line 122.

The ten second controlling square wave is supplied to control transistor 120 on line 122 as follows: The one pulse per second signal from the clock 68 (FIGURE 2) is supplied at terminal 124. It is limited and supplied at the proper voltage by a voltage divider composed of a resistor 126 and diodes 128 to the input 130 of a Schmitt trigger circuit 132. The output of the trigger circuit is supplied as a properly formed input signal via line 134 to a decade divider 136. The output of decade divider 136 is a short pulse every ten seconds. This pulse is supplied to a flip-flop 137 via line 139. The ten second square wave output of flip-flop 137 is supplied on line 140 to resistor 138 and thus to control transistor 120 via line 122.

The inverted or negative signal output of flip-flop 137 is supplied on line 141 as the input to flip-flop 142. Flip-flop 142 changes its state when triggered by the negative going portion of the signal on line 141 and, therefore, produces the properly phased twenty second square wave supplied to line 102 via resistor 144 and line 145.

The remaining elements of the circuit (FIGURE 5B) comprises OR gate 70, fifteen millisecond delay 80, seven millisecond delay 78 and AND gates 84 and 82. The actual logic circuitry for controlling the fifteen millisecond delay 80 is slightly different than the simplified showing of FIGURE 2. The inputs to AND gate 82 are the one pulse per second on line 134 from the trigger circuit 132, the inverted twenty second square wave on line 146 from flip-flop 142 and the inverted ten second square wave on line 141. The output is supplied via line 148 to fifteen millisecond delay 78 and the output thereof on line 150 is supplied as the one input to two input OR gate 70.

The actual logic circuitry for controlling the seven millisecond delay 78 is also different from the simplified showing of FIGURE 2. The output of delay 78 is connected via line 152, as shown, to OR gate 70, and the input thereto is supplied on line 154 from AND gate 82, which has three inputs. These are the one pulse per second on line 134, the inverted twenty second square wave on line 146 and the ten second square wave on line 140.

In the circuit shown in FIGURE 5, the foot rope sensor 28 and head rope sensor 34 may be supplied by Pace Engineering Company of North Hollywood, Calif., as their model CP51G or their model P7 sensor connected in accordance with their manual to their model CD-17 Carrier Demodulator. Furthermore, other depth sensors may be employed. The variable delay 54, as shown in FIGURE 2, may be a pair of flip-flops connected in series or a variable delay line as described in the above-identified copending application. The gated oscillators of FIGURE 2 are conventional. The amplifier 74 and transducer 76 of FIGURE 2 may be supplied be applicants' assignee or by other suppliers.

Relays 90 and 92 may be supplied by the Babcock Company of Costa Mesa, Calif., as their model BR12 crystal can relay. Transistors 104 and 120 are then type 2N3569 and resistors 138 and 144 are each ten kilohms one-half watt resistors. The logic circuitry shown in FIGURE 5 is comprised of integrated circuits noted by the circles connected as shown. The integrated circuits may be supplied by Fairchild Semiconductor in their Micrologic line. Circuit 158 may be a Microamplifier, catalog number 710C, in which case resistor 160 is 3.3 kilohms, diode 162 and diodes 128 are each type 1N462A, resistor 164 is ten kilohms and resistor 126 is ten kilohms, both rated at one-half watt.

Integrated circuits 166, 168, 170, 172, 174 and 176 are each Fairchild Micrologic number U5B 992329; and integrated circuit 177 is number U5B 991429. In this case, resistor 178 is 2.2 kilohms one-half watt and capacitor 180 is .01 microfarad.

The integrated circuits of FIGURE 5B may be obtained from the same supplier. Integrated circuits 184, 186 and 188 are each number U5B 991429, integrated circuits 190 and 192 are each UBX 990029 buffers; and, integrated circuits 194 and 196 are each number UBX 991029 dual gates in which case potentiometers 198 and 200 are each ten kilohms, resistors 202 and 204 are each three kilohms, and capacitors 206 and 208 are each two microfarads.

The temperature sensor 36 is shown in detail in FIGURE 6. It comprises a pair of matched thermistors 210 and 212 connected in circuit with resistors 214 and 216, as shown. These elements may be bought as a unit 218 from the YSI Company as their Thermilinear unit No. 44202. The thermistor sensing probe (not shown) containing unit 218 is mounted at the side of pressure container 24 (FIGURE 1) so that it is exposed to the ocean and senses the temperature thereof. The unit 218 is supplied with an AC voltage across zero adjustment potentiometer 220. This is supplied from a pair of synchronous switches 222 and 224; synchronous switch 222, being supplied with a set DC voltage of 3.3 volts as determined by Zener diode 226 (the negative half of the cycle), and synchronous switch 224, being supplied with zero volts DC from ground line 228 (the positive half of the cycle).

The synchronous switches 222 and 224 are driven at a frequency of three kilocycles per second supplied by a three kilocycle multivibrator 230. Its outputs are supplied as oppositely phased inputs to buffer amplifiers 232 and 234. Since the outputs of the two amplifiers 232 and 234 are out of phase, the synchronous switches 222 and 224 operate alternately.

The zero reference voltage for the unit 218 is taken off zero adjustment potentiometer 220 through resistor 236 and across resistor 238 to ground. This is supplied as one input to a differential amplifier 240. The other input is the output of the thermal sensitive unit 218 taken across resistor 242 and network protecting diode 244. Amplifier 240 is connected to provide unity gain and thus isolates the thermal sensitive network 218 from the rest of the circuit. Amplifier 246 is provided for amplifying and inverting the temperature signal. This is supplied to a primary of a transformer 248. The gain of amplifier 246 may be adjusted by potentiometer 250; thus providing means for presetting the span of the voltage that will be provided as the output of the temperature sensor 36.

The still square wave modulated output of the transformer 248 is applied to the other sides of synchronous switches 222 and 224 and thus is synchronously demodulated and applied as the balanced line output on balanced line 105.

The multivibrator 230, buffers 232 and 234, synchronous switches 222 and 224, amplifiers 240 and 246 of FIGURE 6 are also Fairchild micrologic integrated circuits. Multivibrator 230 is Fairchild No. U5B991429, buffers 232 and 234 are Nos. U5B990029, synchronous switches 222 and 224 are Nos. SH3001, and amplifiers 240 and 246 are Nos. 702C. Transformer 248 is No. DO-T25 supplied by the United Transformer Company.

When the above micrologic elements and the cited transformer are used, otentiometer 220 is one kilohm; resistors 236 and 242 are 9760 ohms, one percent resistors; resistors 252 are 254 are ten kilohms; capacitors 256 and 258 are .047 microfarad; Zener diode 226 may be a type 1N746; resistor 260 is 270 ohms; capacitor 262 is ten microfarads; diode 244 is type 1N482B; resistor 264 is 680 ohms; resistors 266, 268 and 238 are all 9760 ohms, one percent resistors; resistors 270 and 272 are 1960 ohms, one percent resistors; resistors 274 and 276 are 4750 ohms, one percent resistors; potentiometer 250 is 500 kilohms, diode 278 is type 1N482B, capacitors 280 and 282 are .01 microfarad; capacitors 284 and 286 are 100 picofarads; coupling capacitor 287 is 1 microfarad; and filter capacitor 288 connected across balanced line 105 is 2.2 microfarads.

Now referring to FIGURE 7A, a receiver according to the invention may comprise a conventional hydrophone 290 mounted to the bottom of the ship 20 (FIGURE 1). The output is supplied to an amplifier 292, then through a 11 to 13 kilocycle bandpass filter 294 through a second amplifier 296, thence as one input to modulator 298; the other input being supplied by a ten kilocycle beat frequency oscillator 300. The gain of the amplifiers 292 and 296 may be commonly controlled by a single gain control 302 as is conventional. The output of modulator 298 will correspond to the three sets of pulses received by the hydrophone 290 but these will be the difference between ten kilocycles and the actual frequency of the pulses received by the hydrophone.

Thus, the outputs are Ping one at one kilocycle, Ping two at three kilocycles, and Ping three at two kilocycles. These signals are all passed through a three kilocycle low pass filter 304, are amplified by amplifier 306, and supplied to headphones 308 for monitoring the receiver. The signals are also applied to three bandpass filters; a one kilocycle bandpass filter 310 for Ping one; a three kilocycle bandpass filter 312 for Ping two; and a two kilocycle bandpass filter 314 for Ping three. The three signals are demodulated at comparators 316, 318 and 320.

The output of the comparators are squared up pulses at the same frequency as the inputs thereto. For example, the one kilocycle pulses supplied to comparator 316 result in a one kilocycle square wave output for the four millisecond duration of Ping one.

Ping one is supplied to a one-shot multivibrator 322 which provides a delayed output twenty milliseconds thereafter for setting a flip-flop 324 to the ON state, thus opening AND gate 326. As long as flip-flop 324 remains in the ON state, AND gate 326 allows pulses on line 328 to pass therethrough to the counter, generally indicated at 330.

The output of comparator 318 is supplied at the reset input of flip-flop 324. Thus, after receipt of Ping two, AND gate 326 is closed and no further pulses on line 328 are counted by counter 330.

The pulses on line 328 originate at oscillators 332. One oscillator may be provided for each variable. However, in the preferred embodiment disclosed herein, since depth and mouth opening may be measured in the same units, a single depth oscillator 334 is provided and a temperature oscillator 336. These oscillators may be plug-in modules so that they may be quickly changed for changing units of measure, e.g., from feet to fathoms to meters, or from degrees fahrenheit to degrees centigrade. However, as a practical matter the temperature oscillator 336 need not be changed as all fishermen are becoming familiar with the centigrade scale and the depth oscillator 334 need only be changed for changing from meters to fathoms.

The outputs of the oscillators 332 are supplied to comparators 338 and 340. The squared up output signals are supplied as one input to each of AND gates 342 and 344. The second inputs to the AND gates 342 and 344 are appropriately energized one at a time from one-shot multivibrators 346, 348 of FIGURE 7A. The outputs are ORed together at OR gate 347 and supplied as one input to a binary dividing flip-flop 349, which is necessary to buffer the output of OR gate 347. Thus, the pulses on line 328 are supplied for counting.

Three indicator decades 330 may be used as shown. These are reset from a reset generator 350, supplied by the manufacturer. This may be activated by depressing reset button 352. It is also activated at the beginning of each count by receipt of Ping one, which passes through AND gate 354 (which is then activated because flip-flop 324 has not yet been set by the twenty second delayed pulse from flip-flop 322).

Now referring to FIGURE 7A, the AND gates 342 and 344 of FIGURE 7B are activated as follows: Ping one is supplied to a pair of one-shot multivibrators 358 and 360. One-shot 358 provides a seven millisecond delayed output, and one-shot 360 provides a fifteen millisecond delayed output. These are supplied as the inputs to flip-flops 362 and 364 respectively, each providing a four millisecond square output pulse upon receipt of the delayed output from one-shots 358 or 360.

Thus, AND gate 366, supplied with a Ping three at seven milliseconds after $P_1$, supplies an indicating output to one-shot multivibrator 346. The 900 millisecond output thereof indicates that temperature is being measured. On the other hand, if Ping three is received fifteen milliseconds after Ping one, AND gate 368 supplies an indicating output to one-shot multivibrator 348. The 900 millisecond output thereof indicates that mouth opening is being measured.

When temperature is being measured, output conductor 370 activates AND gate 344 effectively connecting the temperature oscillator 336 to the counter 330. At the same time the inverted negative output conductor 372 inhibits AND gate 342. When temperature is not being measured, AND gate 342 is activated and the depth oscillator 334 is thus effectively connected to the counter 330.

One-shot multivibrators 346 and 348 provide an output pulse length of nine hundred milliseconds. Thus, they are automatically reset to OFF when it is time for the system to change to another variable.

The output of the mouth opening one-shot 348 is supplied to lamp driver 374 to activate a mouth opening label 376. The output of temperature one-shot multivibrator 346 is supplied to lamp driver 377 to illuminate a temperature label 378 and a decimal point lamp 380 appropriately placed in the display counters 330. When mouth opening or depth is being measured, that is, when temperature is not being measured, the inverted output of temperature one-shot 346 is supplied to lamp driver 382 to illuminate either a meters or a fathoms label 384 or 386, depending on the position of switch 388. Appropriate decimal points, 390 and 392, are thus similarly illuminated. When neither temperature or mouth opening are being measured, the inhibit outputs from one-shots 346 and 348 are supplied to AND gate 394. It then activates lamp driver 396 to illuminate depth label 398.

The logic elements shown in FIGURES 7A and 7B may all be supplied as integrated circuits by EICO Electronic Instrument Company, Inc. of Flushing, N.Y. under their following catalog numbers: Comparators 316, 318, 320, 338 and 340, No. T–174; one-shots 322, 358, 360, 362, 364, 346, 348 and 356, Nos. T–167; flip-flop 324, No. T–162; flip-flop 349, No. T–102A; AND gates 326 and 354, No. T–318; indicator decades 330, No. N–104; reset generator 350, No. T–129; AND gates 342 and 344 and OR gate 347 may be purchased as a single unit 351, No. T–413; AND gates 366 and 368 may be supplied as a single unit No. T–410A; DC AND gate 394 is No. T–439; lamp drivers 374, 377, 382 and 396 are No. T–130.

Resistors 402, 404 and 406, connected to comparators 316, 318 and 320, are 3.9 kilohms; potentiometers 408, 410 and 412 are 2 kilohms; capacitor 414 connected to one-shot 322 is two microfarads; capacitor 416 connected to one-shot 356 is .1 microfarad, providing a one millisecond output pulse; resistor 418 is 2.2 kilohms; resistors 420 and 422 connected to comparators 338 and 340 are each 3.3 kilohms; and resistors 424 and 426, similarly connected, are one kilohm. All lamps shown operate at six volts. In FIGURE 7A, capacitor 428 is .7 microfarad; capacitor 430 is 1.5 microfarads; capacitors 432 and 434 are .4 microfarad; and capacitors 436 and 438 are 90 microfarads.

It will be understood by those skilled in the art that the system of the present invention may be used to transmit different variables, for example, salinity, using appropriate sensors. Additional pings may be employed for telemetering more than three variables or, for example, the transmission of a Ping three at both seven milliseconds and fifteen milliseconds after Ping one could indicate the transmission of a fourth variable. It will also be understood that other frequencies may be employed both for the purpose of increasing the discrimination of the system or the number of variables transmitted. Furthermore, all pings could be of the same frequency. Because the variable information transmitted is limited to the band of twenty to four hundred milliseconds after Ping one, the present system is compatible with present day graphic recorders of ship echo sounders and they may be employed as receivers with this system in the manner more fully described in the above-identified copending application. The multiple transmission of each variable for a plurality of Ping ones provides for the "ping line" auto correlation described therein as well as for that found herein (an obviously erroneous reading for one second).

It will also be understood by those skilled in the art that the time $T_2$ may be any conveniently realizable function of the variable sensed and does not have to be directly proportional as in the example given.

It will thus be seen that the objects set forth above among those made apparent from the preceding description are efficiently attained and since certain changes may be made in the system, constructions and method set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An underwater acoustic telemetering receiver comprising:
   (A) a counter;
   (B) at least two oscillators for supplying pulses to be counted by said counter;
   (C) first gating means for supplying pulses from said oscillators to said counter for a time defined by the receipt of a first and a second distinct acoustic pulse; and
   (D) second gating means for gating only one of said oscillators to said first gating means at a time depending on the receipt or lack of receipt of at least a third distinct acoustic pulse.

2. An underwater acoustic telemetering receiver as defined in claim 1 wherein said counter is an indicating counter.

3. An underwater acoustic telemetering receiver as defined in claim 1 further comprising:
   (E) indicating means under control of said second gating means for indicating the variable being telemetered.

4. An underwater acoustic telemetering receiver as defined in claim 1 wherein at least one of said oscillators is gated to said counter by said second gating means for a fixed period.

5. An underwater acoustic telemetering receiver as defined in claim 1 for receiving three telemetered variables wherein said second gating means connects a first and a second oscillator to said first gating means for fixed periods and otherwise connects a third oscillator to said counter, said third oscillator not necessarily being distinct from said first and second oscillators.

6. An underwater acoustic telemetering receiver as defined in claim 1 wherein said third distinct acoustic pulse is transmitted at least one fixed time period subsequent to said first distinct acoustic pulse; and said second gating means comprises delay means synchronized by said first distinct acoustic pulses for determining receipt or nonreceipt of said third distinct acoustic pulses.

References Cited

UNITED STATES PATENTS

| | | | |
|---|---|---|---|
| 2,852,763 | 9/1958 | Westcott et al. | 340—183 |
| 3,341,660 | 9/1967 | Duerdoth | 179—15 |
| 2,744,959 | 5/1956 | Greefkes et al. | 325—143 |
| 3,159,832 | 12/1964 | Cox | 343—112.4 |

RODNEY D. BENNETT, JR., *Primary Examiner.*

JOSEPH G. BAXTER, *Assistant Examiner.*

U.S. Cl. X.R.

325—143; 340—206